(12) United States Patent
Kujime et al.

(10) Patent No.: US 10,967,683 B2
(45) Date of Patent: Apr. 6, 2021

(54) PNEUMATIC TIRE

(71) Applicant: Sumitomo Rubber Industries, Ltd., Kobe (JP)

(72) Inventors: Tomoyuki Kujime, Kobe (JP); Hiroshi Okagawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 302 days.

(21) Appl. No.: 15/711,611

(22) Filed: Sep. 21, 2017

(65) Prior Publication Data

US 2018/0086148 A1 Mar. 29, 2018

(30) Foreign Application Priority Data

Sep. 26, 2016 (JP) .............................. JP2016-186911

(51) Int. Cl.
*B60C 11/12* (2006.01)
*B60C 11/04* (2006.01)
*B60C 11/03* (2006.01)

(52) U.S. Cl.
CPC ....... *B60C 11/1236* (2013.01); *B60C 11/0311* (2013.01); *B60C 11/04* (2013.01); *B60C 11/0304* (2013.01); *B60C 2011/039* (2013.01); *B60C 2011/0341* (2013.01); *B60C 2011/0344* (2013.01); *B60C 2011/0353* (2013.01); *B60C 2011/0381* (2013.01); *B60C 2011/0388* (2013.01); *B60C 2011/1227* (2013.01); *B60C 2011/1245* (2013.01); *B60C 2011/1254* (2013.01)

(58) Field of Classification Search
CPC ..... B60C 2011/0381; B60C 2011/1245; B60C 11/1236
See application file for complete search history.

(56) References Cited

U.S. PATENT DOCUMENTS

2009/0159167 A1* 6/2009 Scheuren ........... B29D 30/0606
152/209.18
2009/0255614 A1* 10/2009 Ebiko ................. B60C 11/0302
152/209.8

(Continued)

FOREIGN PATENT DOCUMENTS

EP 2 505 387 A1 10/2012
EP 2 610 082 A2 7/2013

(Continued)

OTHER PUBLICATIONS

Extended European Search Report dated Feb. 9, 2018, in European Patent Application No. 17191782.6.

*Primary Examiner* — Alison L Hindenlang
*Assistant Examiner* — George W. Brady
(74) *Attorney, Agent, or Firm* — Birch, Stewart, Kolasch & Birch, LLP

(57) ABSTRACT

The pneumatic tire comprises a tread portion 2 provided with first sipes 25 and second sipes 26 and having a first tread half portion 21 and a second tread half portion 22. The first sipes 25 are smoothly continued from a crown land region 10 in the second tread half portion 22 to a shoulder land region 13 in the first tread half portion 21 through a crown main groove 3 and a shoulder main groove 5. The second sipes 26 extend from the crown land region 10 in the second tread half portion 22 toward a second tread edge Te2.

17 Claims, 5 Drawing Sheets

(56) References Cited

U.S. PATENT DOCUMENTS

| | | | | |
|---|---|---|---|---|
| 2012/0118455 A1* | 5/2012 | Hada | ............... | B60C 11/0304 |
| | | | | 152/209.8 |
| 2013/0167997 A1* | 7/2013 | Hayashi | ............. | B60C 11/0306 |
| | | | | 152/209.18 |
| 2014/0283967 A1 | 9/2014 | Inoue | | |
| 2014/0305559 A1* | 10/2014 | Takemoto | .......... | B60C 11/0304 |
| | | | | 152/209.8 |
| 2015/0258858 A1* | 9/2015 | Kujime | ............. | B60C 11/1369 |
| | | | | 152/209.8 |
| 2016/0039248 A1 | 2/2016 | Sueno | | |
| 2016/0185160 A1 | 6/2016 | Mukai | | |
| 2019/0184760 A1* | 6/2019 | Cerny | ................ | B60C 11/1259 |

FOREIGN PATENT DOCUMENTS

EP  3 260 309 A1  12/2017
JP  2014-184828 A  10/2014

* cited by examiner

PNEUMATIC TIRE

TECHNICAL FIELD

The present invention relates to a pneumatic tire, more particularly to a tread pattern capable of improving steering stability.

BACKGROUND ART

Japanese Patent Application Publication No. 2014-184828 discloses a pneumatic tire, wherein, in order to improve the steering stability, straight main grooves extending continuously in the tire circumferential direction are disposed on the tire equator and both sides thereof, and two axially inner land regions between the three straight main grooves are not provided with wide lateral grooves so as not to decrease the rigidity of the axially inner land regions and thereby to improve the steering stability.
Further, each of the axially inner land regions and two axially outer shoulder land regions is provided with sipes each curved describing an arc, and the sipes in the axially inner land regions are different from the sipes in the axially outer shoulder land regions with respect to the inclining directions.

When the tread portion of such tire is subjected to a load, the axially inner land regions and the axially outer shoulder land regions are deformed in different modes. As a result, there is a possibility that transient characteristics at the time when the center in the tire axial direction of the ground contact patch of the tire is moved from the tread center (tire equator) toward the tread shoulder (tread edge) during cornering at a large slip angle, is affected.

SUMMARY OF THE INVENTION

The present invention was made in view of the above situation, and accordingly, an object of the present invention is to provide a pneumatic tire in which transient characteristic during cornering is improved to provide good steering stability.

According to the present invention, a pneumatic tire comprises:
a tread portion provided on each side of the tire equator with an axially inner crown main groove and an axially outer shoulder main groove each extending continuously in the circumferential direction so as to define a crown land region between the crown main grooves, a pair of middle land regions between the crown main grooves and shoulder main grooves, and a pair of shoulder land regions axially outside the shoulder main grooves,
wherein
the tread portion, which has a first tread half portion between the tire equator and a first tread edge and a second tread half portion between the tire equator and a second tread edge, is provided with
first sipes each smoothly continued from a position in the crown land region in the second tread half portion to a position in the shoulder land region in the first tread half portion through the crown main groove and the shoulder main groove in the first tread half portion, and
second sipes each extending from a position in the crown land region in the second tread half portion toward the second tread edge.

Therefore, in the pneumatic tire according to the present invention, as the first sipes and the second sipes extend toward the first tread edge and the second tread edge, respectively, from the crown land region in the second tread half portion, the crown land region is appropriately deformed when the slip angle is small, and moderate initial steering response can be obtained. Further, as the first sipes are smoothly continued from the crown land region to the shoulder land region in the first tread half portion through the crown main groove and the shoulder main groove, the crown land region, the middle land region and the shoulder land region in the first tread half the portion are deformed in the same mode along the first sipes. Consequently, it is possible to improve the transient characteristic at the time when the center of the ground contact patch is moved from the crown land region toward the shoulder land region during cornering at a large slip angle. As a result, good steering stability can be obtained.

The pneumatic tire according to the present invention may further include the following features (1)-(8):
(1) the shoulder land region in the first tread half portion is provided with first shoulder lug grooves each extending axially inwardly from the first tread edge and having an axially inner end within the shoulder land region, and
the above-said first sipes are respectively connected to the axially inner ends of the first shoulder lug grooves;
(2) the above-said second sipes are smoothly continued from the crown land region in the second tread half portion to the shoulder land region in the second tread half portion through the crown main groove and the shoulder main groove in the second tread half portion;
(3) the shoulder land region in the second tread half portion is provided with
second shoulder lug grooves each extending axially inwardly from the second tread edge and having an axially inner end within the shoulder land region in the second tread half portion, and
third sipes extending axially inwardly from the axially inner ends of the respective second shoulder lug grooves, and connected to the respective second sipes in the middle land region in the second tread half portion;
(4) the third sipes are smoothly continued from the shoulder land region to the middle land region through the shoulder main groove in the second tread half portion;
(5) the third sipes are disposed one between every two of the circumferentially adjacent second sipes;
(6) each of the first sipes is inclined with respect to the tire axial direction in the crown land region, the middle land region and the shoulder land region;
(7) the second sipes in the crown land region and the middle land region in the second tread half portion are inclined in the same direction as the first sipes;
(8) the width of the shoulder main groove in the first tread half portion is less than the width of the shoulder main groove in the second tread half portion.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.
The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The tread edges Te1 and Te2 are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges determined as above.

The term "sipe" means a very narrow groove whose width is less than 2 mm inclusive of a cut having no substantial width.

DESCRIPTION OF THE PREFERRED EMBODIMENTS

The present invention is suitably applied to a pneumatic tire for passenger cars.

Taking a pneumatic tire for passenger cars as an example, embodiments of the present invention will now be described in detail in conjunction with the accompanying drawings.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

Figure 1:
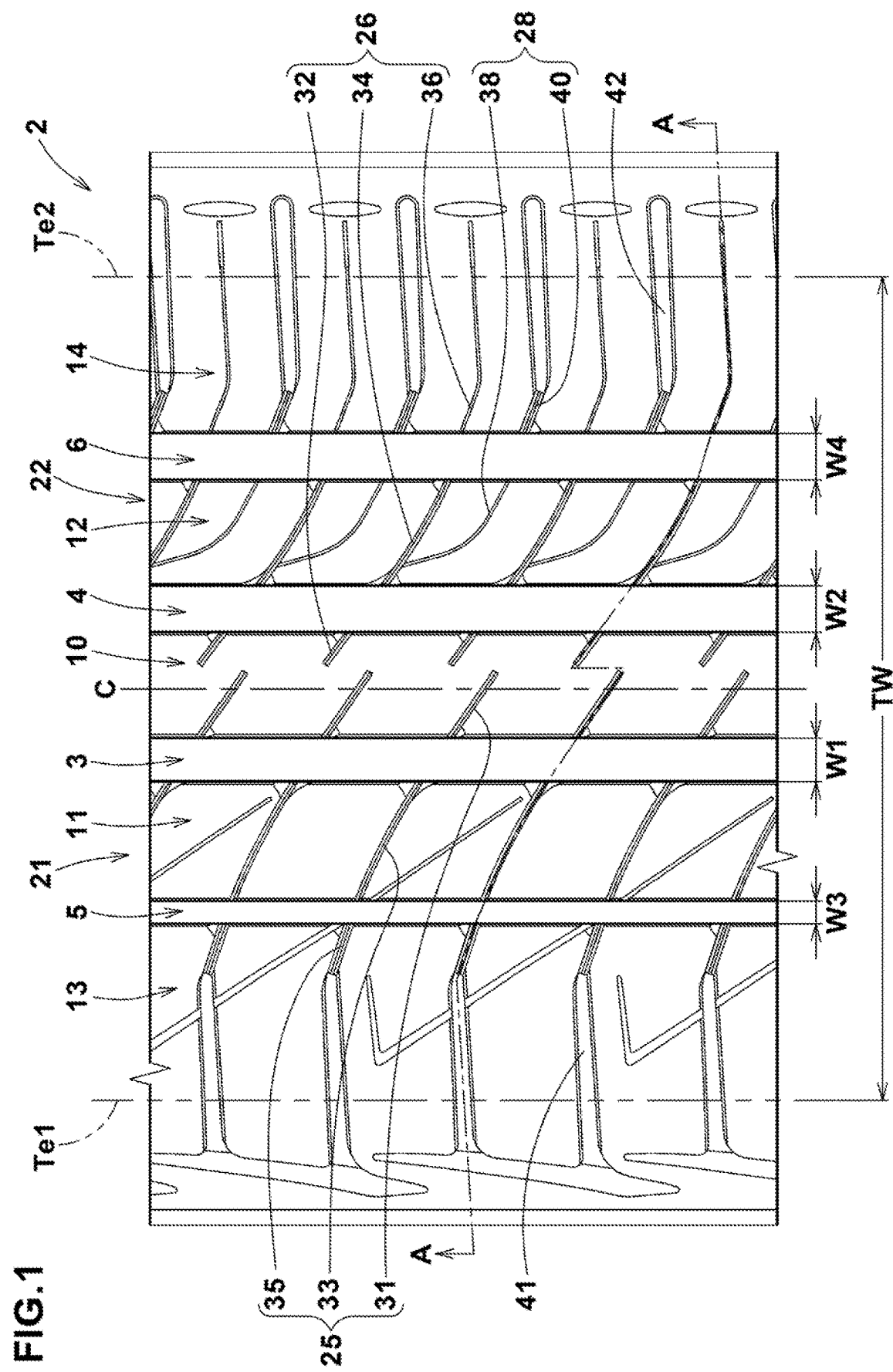
FIG. 1 is a developed partial plan view of a pneumatic tire as an embodiment of the present invention showing the tread portion.
Figure 2:
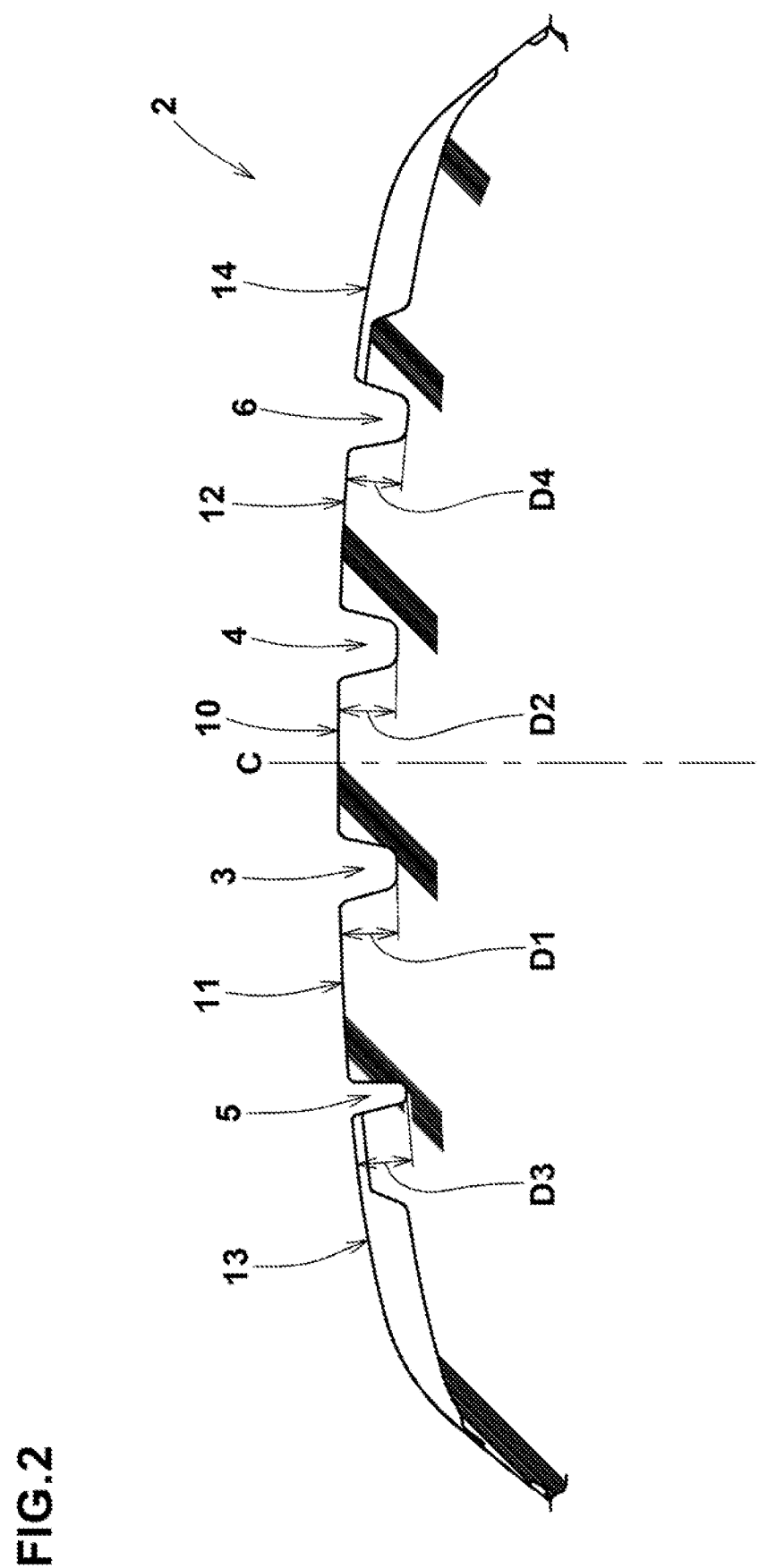
FIG. 2 is a cross sectional view of the tread portion.

FIG. 1 shows the pneumatic tire as an embodiment of the present invention.

In the present embodiment, the tread portion 2 is provided with an asymmetrical tread pattern, and the mounting position of the tire, namely, which side of the tire is outside, is specified by an indication such as characters and marking provided on the tire sidewall portion (not shown).

Thus, the tread portion 2 has a first tread edge Te1 to be positioned away from the center of a vehicle body, and a second tread edge Te2 to be positioned close to the center of the vehicle body.

As shown in FIG. 1, the tread portion 2 is provided with main grooves 3-6 extending continuously in the tire circumferential direction. The main grooves 3-6 include a first crown main groove 3 and a second crown main groove 4 disposed on the first tread edge side and the second tread edge side of the tire equator c, respectively, a first shoulder main groove 5 disposed axially outside the first crown main groove 3, and a second shoulder main groove 6 disposed axially outside the second crown main groove 4.

In the present embodiment, the main grooves 3-6 are formed as straight grooves to improve drainage and thereby to improve wet performance of the tire.

In the case of a passenger car tire, it is preferable that the widths w1 and w2 of the crown main grooves 3 and 4 and the widths w3 and w4 of the shoulder main grooves 5 and 6 are set in a range from 4.0% to 8.5% of the tread width TW. If less than 4.0% of the tread width TW, there is a possibility that drainage performance is deteriorated. If more than 8.5% of the tread width TW, there is a possibility that the rubber volume of the tread portion 2 is decreased and wear resistance is deteriorated.

In the case of a passenger car tire, it is preferable that the depths D1 and D2 of the crown main grooves 3 and 4 and the depths D3 and D4 of the shoulder main grooves 5 and 6 are set in a range from 5 to 10 mm.

If less than 5 mm, there is a possibility that drainage performance is deteriorated. If more than 10 mm, there is a possibility that the rigidity of the tread portion 2 is decreased and steering stability is deteriorated.

The tread portion 2 is axially divided by the main grooves 3-6 into land regions 10-14, more specifically, a crown land region 10 between the crown main grooves 3 and 4, a first middle land region 11 between the first crown main groove 3 and the first shoulder main groove 5, a second middle land region 12 between the second crown main groove 4 and the second shoulder main groove 6, a first shoulder land region 13 axially outside the first shoulder main groove 5, and a second shoulder land region 14 axially outside the second shoulder main groove 6.

The tread portion 2 has a first tread half portion 21 extending from the tire equator C to the first tread edge Te1, and a second tread half portion 22 extending from the tire equator C to a second tread edge Te2.

when the pneumatic tire is mounted on a vehicle, the first tread half portion 21 is positioned toward the outside of the vehicle.

It is preferable that the width w3 of the first shoulder main groove 5 in the first tread half portion 21 is set to be less than the width W4 of the second shoulder main groove 6 in the second tread half portion 22 in order that the ground contacting area of the first tread half portion 21 becomes more than the ground contacting area of the second tread half portion 22 and thereby cornering performance is improved.

In the first tread half portion 21, there are the first shoulder main groove 5, the first crown main groove 3, the first shoulder land region 13, the first middle land region 11, and a part of the crown land region 10.

In the second tread half portion 22, there are the second shoulder main groove 6, the second crown main groove 4, the second shoulder land region 14, the second middle land region 12, and a part of the crown land region 10.

The crown land region 10 is centered on the tire equator C. By the crown land region 10, initial steering response when the driver initiates turning of the steering wheel is improved to obtain good steering stability.

In the present embodiment, the first middle land region 11 and the crown land region 10 in the first tread half portion 21 are provided with no grooves whose width is 2 mm or more, therefore, groove edges from which uneven wear so called heel and toe wear is liable to occur are eliminated from the crown land region 10 and the first middle land region 11, and the uneven wear resistance is increased.

Also the second middle land region 12 and the crown land region 10 in the second tread half portion 22 are provided with no grooves whose width is 2 mm or more, therefore, the uneven wear resistance is increased similarly to the first tread half portion 21.

The first tread half portion 21 is provided with first sipes 25 whose width is less than 2 mm.
The second tread half portion 22 is provided with second sipes 26 whose width is less than 2 mm.
In the present embodiment, as the crown land region 10 and the middle land regions 11 and 12 are provided with no grooves whose width is not less than 2 mm, there is a possibility that the drainage in the crown land region 10 and middle land regions 11 and 12 is deteriorated. However, by the edge effect of the first sipes 25 and second sipes 26, good wet performance can be obtained.

During running, the first sipes 25 and second sipes 26 in the ground contact patch are closed to increase the rigidity of the tread portion 2. Thereby, the steering stability is improved. Further, uneven wear is hard to occur from the edges of the closed first sipes 25 and second sipes 26, and the uneven wear resistance is not deteriorated.

In order that the tread portion 2 is provided with sufficient rigidity to improve the steering stability, it is preferred that the depth of the first sipe 25 is less than 80% of the depth D1 of the first crown main groove 3 and less than 80% of the depth D3 of the first shoulder main groove 5, and the depth of the second sipe 26 is less than 80% of the depth D2 of the second crown main groove 4 and less than 80% of the depth D4 of the second shoulder main groove 6.

Each of the first sipes 25 and second sipes 26 extends along an arc-shaped curved line extending in the tire axial direction. such first sipes 25 and second sipes 26 allow the load on the tread portion to be dispersed in multi-directions and serves to improve the steering stability.

Each of the first sipes 25 extends toward the first tread edge Te1 from a position in the crown land region 10 in the second tread half portion 22.
Each of the second sipes 26 extends toward the second tread edge Te2 from a position in the crown land region 10 in the second tread half portion 22.
By the first sipes 25 and second sipes 26, the crown land region 10 is appropriately deformed when the slip angle is small, and moderate initial steering response can be obtained.

Figure 3:
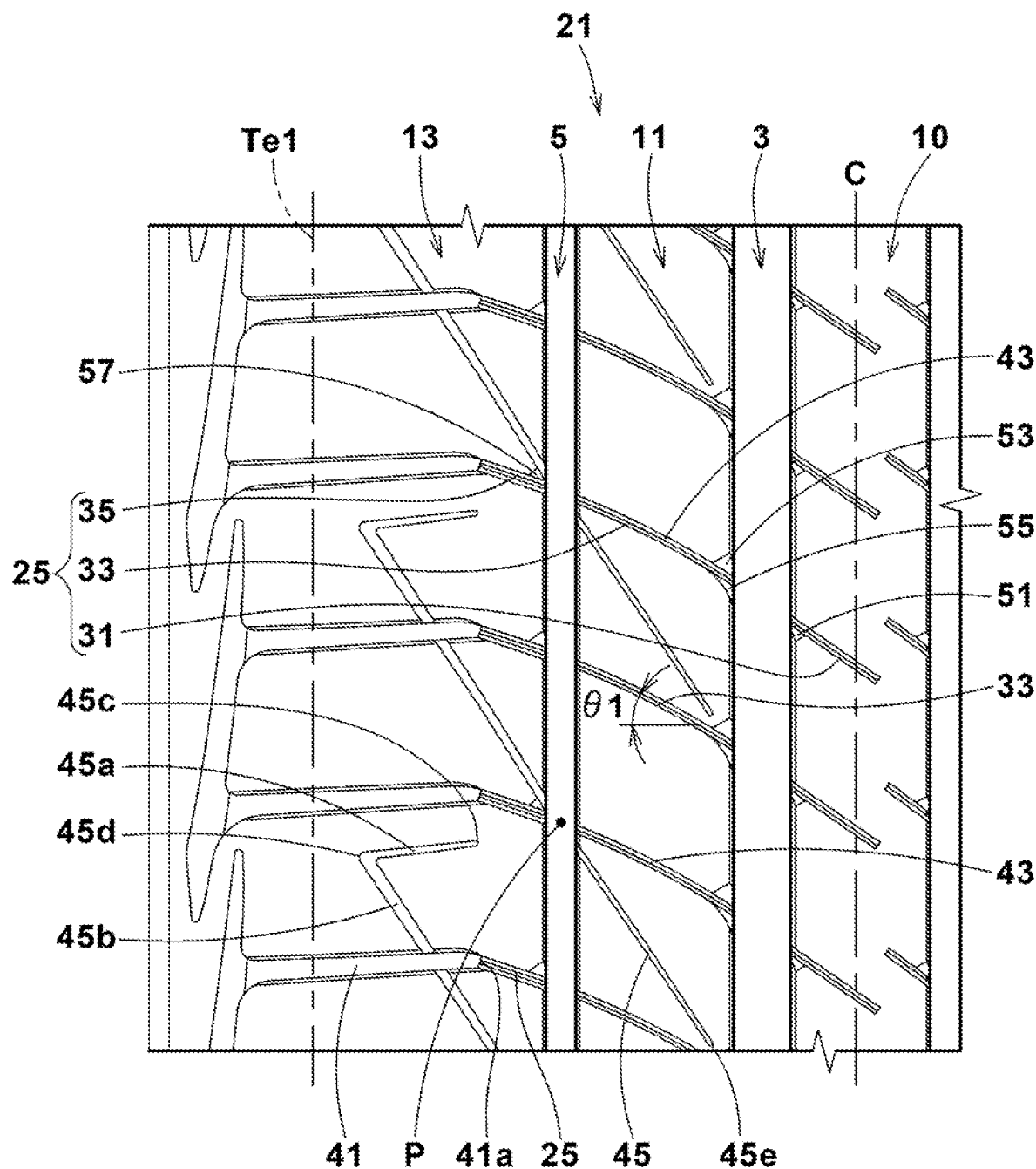
FIG. 3 is a developed view showing the first tread half portion in FIG. 1.

As shown in FIG. 3, the first sipes 25 are smoothly continued from the crown land region 10 to the first shoulder land region 13 through the first crown main groove 3 and first shoulder main groove 5. Thereby, the change in the rigidity of the first tread half portion 21 from the crown land region 10 to the first shoulder land region 13 becomes moderate, and the crown land region 10, the first middle land region 11 and the first shoulder land region 13 are deformed in the same mode along the first sipes 25. Therefore, the transient characteristic at the time when the center of the ground contact patch is moved from the crown land region 10 to the first shoulder land region 13 during cornering at a large slip angle, is improved, and good steering stability can be obtained.

In the crown land region 10, the first middle land region 11 and the first shoulder land region 13, each of the first sipes 25 is inclined with respect to the tire axial direction.
Thereby, the balance between the rigidity in the tire circumferential direction and the rigidity in the tire axial direction of the first tread half portion 21 is improved, and the transient characteristic from straight running to cornering is improved. Thus, good steering stability can be obtained.

It is preferable that, in the first middle land region 11, the first sipe 25 has an angle θ1 in a range from 15 degrees to 40 degrees with respect to the in the tire axial direction. If less than 15 degrees, there is a possibility that the rigidity in the tire circumferential direction of the first middle land region 11 decreases, and heel and toe wear occurs from the first sipes 25. If more than 40 degrees, there is a possibility that the rigidity in the tire axial direction of the first middle land region 11 decreases, and the transient characteristic during cornering at a large slip angle is affected.

Figure 4:
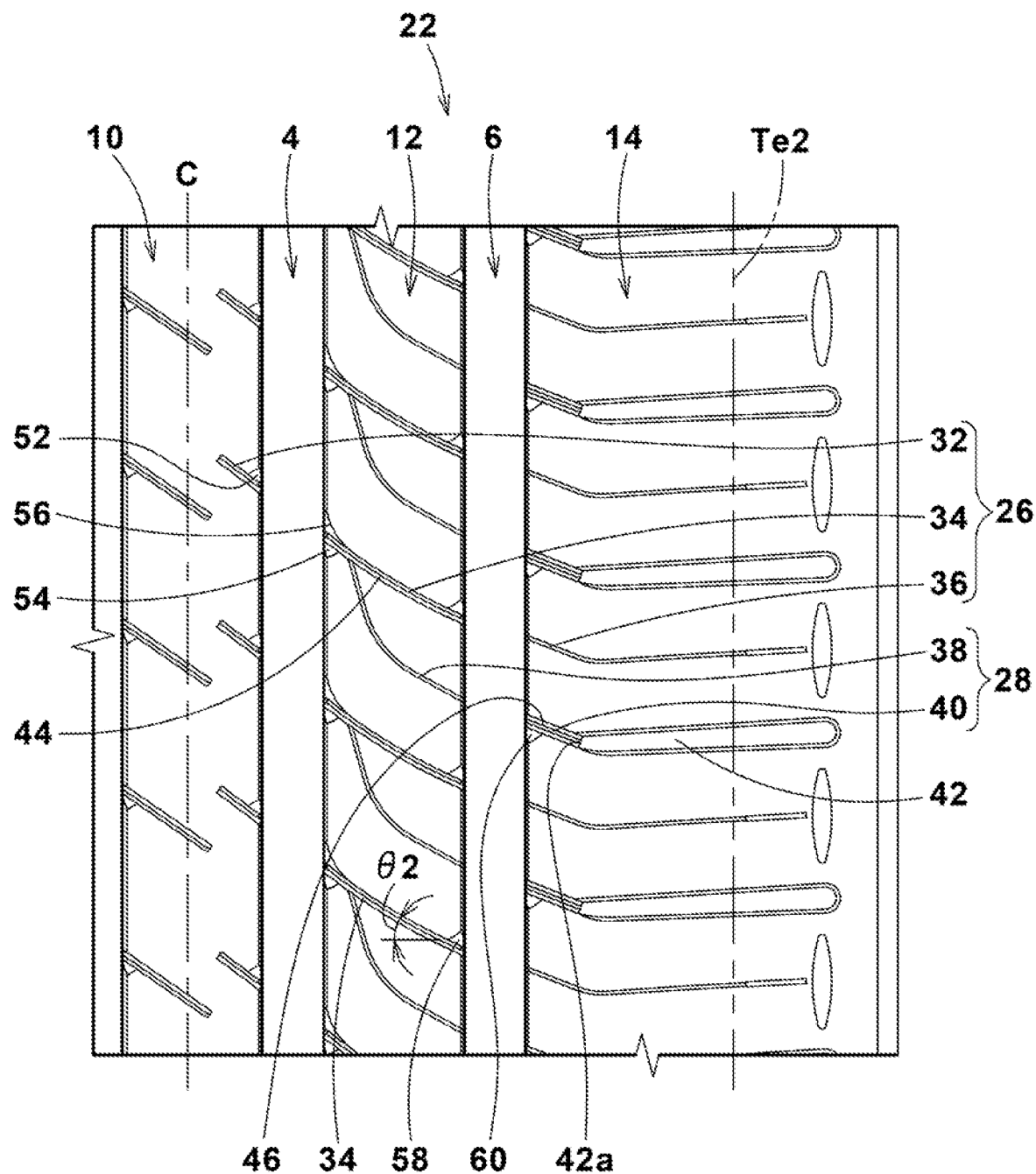
FIG. 4 is a developed view showing the second tread half portion in FIG. 1.

In the present embodiment, as shown in FIG. 4, the second sipes 26 are smoothly continued from the crown land region 10 in the second tread half portion 22 to the second tread edge Te2 through the second crown main groove 4 and the second shoulder main groove 6. Thereby, the change in the rigidity of the second tread half portion 22 from the crown land region 10 to the second shoulder land region 14 becomes moderate, and the crown land region 10, the second middle land region 12 and the second shoulder land region 14 are deformed in the same mode along the second sipes 26. Therefore, the transient characteristic at the time when the center of the ground contact patch is moved from the crown land region 10 to the second shoulder land region 14 during cornering at a large slip angle, is improved, and good steering stability can be obtained.

The second sipes 26 in at least the crown land region 10 and the second middle land region 12 are inclined with respect to the in the tire axial direction in the same direction as the first sipes 25. Thereby, when the slip angle increases, the tire is deformed in the same mode from the first tread half portion 21 to the second tread half portion 22, and the transient characteristic during cornering is improved to provide good steering stability.

It is preferable that, in the second middle land region 12, the angle θ2 of the second sipe 26 with respect to the in the tire axial direction is set in a range from 20 degrees to 45 degrees.
If less than 20 degrees, there is a possibility that the rigidity in the tire circumferential direction of the second middle land region 12 decreases, and heel and toe wear is liable to occur from the second sipes 26. If more than 45 degrees, there is a possibility that the rigidity in the tire axial direction of the second middle land region 12 decreases, and the transient characteristic during cornering at a large slip angle is deteriorated.

It is preferable that, when the first tread half portion 21 is positioned toward the outside of the vehicle, the angle between the tire axial direction and a straight line drawn between both ends of the first sipe 25 in the first middle land region 11 is less than the angle between the tire axial direction and a straight line drawn between both ends of the second sipe 26 in the second middle land region 12.

Thereby, the rigidity in the tire axial direction of the first tread half portion 21 is relatively increased to improve the steering stability.

As shown in FIG. 3, the first shoulder land region 13 is provided with first shoulder lug grooves 41.

The first shoulder lug grooves 41 extend straight axially inwardly from the first tread edge Te1 and have axially inner ends 41a within the first shoulder land region 13.

Further, the first shoulder lug grooves 41 extend axially outwardly beyond the first tread edge Te1.

The width of each of the first shoulder lug grooves 41 is not less than 2 mm.

By the first shoulder lug grooves 41, the drainage in the first shoulder land region 13 is increased to further improve the wet performance of the pneumatic tire.

The first sipes 25 are respectively connected to the axially inner ends 41a of the first shoulder lug grooves 41. Thereby, the change in the rigidity of the first tread half portion 21 from the crown land region 10 to the first shoulder land region 13 becomes moderate, and the transient characteristic during cornering at a large slip angle is improved, and good steering stability can be obtained.

As shown in FIG. 4, the second shoulder land region 14 is provided with second shoulder lug grooves 42 each extending straight axially inwardly from the second tread edge Te2 and having an axially inner end 42a within the second shoulder land region 14.

Further, the second shoulder lug grooves 42 extend axially outwardly beyond the second tread edge Te2.

The width of each of the second shoulder lug grooves 42 is not less than 2 mm.

By the second shoulder lug grooves 42, the drainage of the second shoulder land region 14 is increased to further improve the wet performance of the pneumatic tire.

The second tread half portion 22 is provided with third sipes 28 extending axially inwardly from the axially inner ends 42a of the respective second shoulder lug grooves 42. The third sipes 28 are curved toward and connected to the respective second sipes 26 within the second middle land region 12. By the third sipes 28, the change in the rigidity of the second tread half portion 22 from the second middle land region 12 to the second shoulder land region 14 becomes moderate, and the transient characteristic during cornering at a large slip angle is improved, and good steering stability can be obtained.

In the second tread half portion 22, the third sipes 28 are smoothly continued from the second shoulder land region 14 to the second middle land region 12 through the second shoulder main groove 6.

By the third sipes 28, the change in the rigidity of the second tread half portion 22 from the second middle land region 12 to the second shoulder land region 14 becomes moderate, and the transient characteristic during cornering at a large slip angle is further improved, and good steering stability can be obtained.

The third sipes 28 are disposed one between every two of the circumferentially adjacent second sipes 26. Namely, the second sipes 26 alternate with the third sipes 28 in the tire circumferential direction. Thereby, in the second middle land region 12 and the second shoulder land region 14, the rigidity distribution is evened, and it becomes possible to obtain good uneven wear resistance and steering stability.

With respect to the in the tire axial direction, the third sipes 28 are inclined in the same direction as the first sipes 25. Thereby, when the slip angle increases, the tire is deformed in the same mode from the first tread half portion 21 to the second tread half portion 22, and the transient characteristic during cornering is improved to provide good steering stability.

As shown in FIG. 3, the first tread half portion 21 is provided with first shallow grooves 43.

Each of the first shallow grooves 43 is formed along one of the first sipes 25 so as to include the first sipe 25. In other words, the first sipes 25 are each formed in the bottom of one of the first shallow grooves 43.

It is preferable that the depth of the first shallow grooves 43 is less than the depth of the first sipes 25, and in a range from 10% to 30% of the depth D1 of the first crown main groove 3, and in a range from 10% to 30% of the depth D3 of the first shoulder main groove 5.

As a result, the first shallow grooves 43 have only a limited effect on the steering stability and uneven wear resistance, and improve the wet performance in the initial stage of the tread wear life.

As shown in FIG. 4, the second tread half portion 22 is provided with second shallow grooves 44.

Each of the second shallow grooves 44 is formed along one of the second sipes 26 so as to include the second sipe 26. In other words, the second sipes 26 are each formed in the bottom of one of the second shallow grooves 44.

It is preferable that the depth of the second shallow grooves 44 is less than the depth of the second sipes 26, and in a range from 10% to 30% of the depth D2 of the second crown main groove 4, and in a range from 10% to 30% of the depth D4 of the second shoulder main groove 6.

As a result, the second shallow grooves 44 have only a limited effect on the steering stability and uneven wear resistance, and improve the wet performance in the initial stage of the tread wear life.

The first shallow grooves 43 are positioned on one side in the tire circumferential direction of the respective first sipes 25 in the crown land region 10 and the first middle land region 11, whereas the second shallow grooves 44 are positioned on the other side in the tire circumferential direction of the respective second sipes 26 in the crown land region 10 and the second middle land region 12.

Thereby, the arrangement in the tire circumferential direction of the first shallow grooves 43 and the second shallow grooves 44 is evened, and stable wet performance can be obtained.

In the first shoulder land region 13, however, each of the first shallow grooves 43 is positioned on both sides in the tire circumferential direction of one of the first sipes 25. In other words, each of the first sipes 25 is disposed along the widthwise center line of one of the first shallow grooves 43. Thereby, the drainage of the first shoulder land region 13 is increased.

Figure 5:
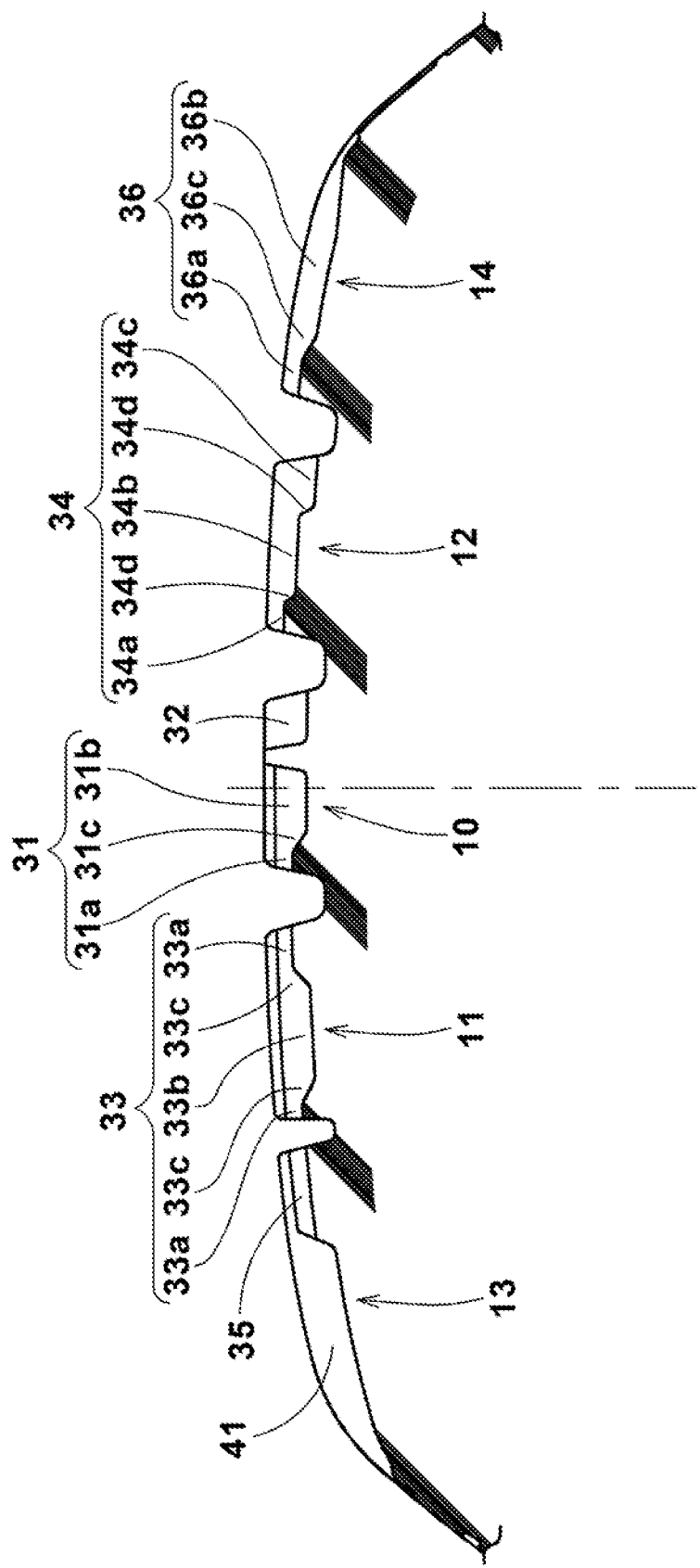
FIG. 5 is a cross sectional view of the tread portion taken along line A-A of FIG. 1.

As shown in FIG. 3 and FIG. 5, each of the first sipes 25 are intersected by the first crown main groove 3 and the first shoulder main groove 5. Therefore, the first sipe 25 is split in a first crown sipe section 31 in the crown land region 10, a first middle sipe section 33 in the first middle land region 11, and a first shoulder sipe section 35 in the first shoulder land region 13.

Thus, the first crown sipe section 31 and the first middle sipe section 33 are smoothly continued through the first crown main groove 3. The first middle sipe section 33 and the first shoulder sipe section 35 are smoothly continued through the first shoulder main groove 5. In other words, the first crown sipe section 31 and the first middle sipe section 33 are disposed on a smoothly curved or substantially straight line. The first middle sipe section 33 and the first shoulder sipe section 35 are disposed on a smoothly curved or substantially straight line. Thereby, the rigidity distribution and ground pressure distribution in the land regions 10, 11 and 13 become smooth along the sipe sections 31, 33 and 35, and uneven wear is further suppressed. Further, the transient characteristic during cornering is improved, and the steering stability of the pneumatic tire is improved.

In the present embodiment, as shown in FIG. 5, the first crown sipe section 31 comprises a shallow part 31a having a constant depth, a deep part 31b having a constant depth more than the shallow part, and an inclined part 31c having a depth linearly varying therebetween.

The deep part 31b is deepest and remains in the crown land region 10 after the middle stage of the tread wear life so as to provide the edge effect.

The shallow part 31a is disposed adjacently to the first crown main groove 3 in order to secure sufficient rigidity of the crown land region 10 to improve the steering stability. The deep part 31b is disposed across the tire equator C.

The inclined part 31c extends from the shallow part 31a to the deep part 31b.

The axial length of the deep part 31b is more than the sum of the axial length of the shallow part 31a and the axial length of the inclined part 33c.

Thereby, the crown land region 10 is appropriately deformed when the slip angle is small, and as a result, moderate initial steering response can be obtained.

Even after the middle stage of the tread wear life, the first crown sipe section 31 provides the edge effect and the steering stability is improved.

In the present embodiment, as shown in FIG. 5, the first middle sipe section 33 comprises a shallow part 33a having a constant depth, a deep part 33b having a constant depth, and an inclined part 33c having a depth linearly varying therebetween.

The deep part 33b is deepest and remains in the first middle land region 11 after the middle stage of the tread wear life so as to provide the edge effect.

The shallow part 33a is formed adjacently to each of the main grooves 3 and 5 between which the first middle land region 11 is defined so that the first middle land region 11 can secure sufficient rigidity to improve the steering stability.

The deep part 33b is formed in the axial center of the first middle land region 11.

The inclined part 33c is formed between the deep part 33b and each of the shallow parts 33a.

The axial length of the deep part 33b is more than the total axial length of the two inclined parts 33c.

Thereby, even after the middle stage of the tread wear life, the first middle sipe section 33 provides an edge effect to improve the steering stability.

The depth of the first shoulder sipe section 35 is set to be constant and the substantially same as the depth of the shallow part 33a so that the crown land region 10 and the first shoulder land region secure sufficient rigidity, and the steering stability is improved.

As shown in FIG. 4 and FIG. 5, each of the second sipes 26 is intersected by the second crown main groove 4 and the second shoulder main groove 6. Therefore, the second sipe 26 is split in a second crown sipe section 32 in the crown land region 10, a second middle sipe section 34 in the second middle land region 12, and a second shoulder sipe section 36 in the second shoulder land region 14.

Thus, the second crown sipe section 32 and the second middle sipe section 34 are smoothly continued through the second crown main groove 4. The second middle sipe section 34 and the second shoulder sipe section 36 are smoothly continued through the second shoulder main groove 6. In other words, the second crown sipe section 32 and the second middle sipe section 34 are disposed on a smoothly curved or substantially straight line. The second middle sipe section 34 and the second shoulder sipe section 36 are disposed on a smoothly curved or substantially straight line. Thereby, the rigidity distribution and ground pressure distribution in the land regions 10, 12 and 14 become smooth along the sipe sections 32, 34 and 36, and the uneven wear is further suppressed. Further, the transient characteristic during cornering is improved, and the steering stability of the pneumatic tire is improved.

The depth of the second crown sipe section 32 is constant and the substantially same as the depth of the deep part 31b so that the crown land region 10 is appropriately deformed when the slip angle is small, and as a result, moderate initial steering response can be obtained. Even after the middle stage of the tread wear life, the second crown sipe section 32 provides the edge effect to improve the steering stability.

As shown in FIG. 5, the second middle sipe section 34 comprises a shallow part 34a having a constant depth, a mid-depth part 34b having a constant depth more than the shallow part, a deep part 34c having a constant depth more than the mid-depth part 34b, and an inclined part 34d having a linearly varying depth.

The mid-depth part 34b and the deep part 34c remain in the crown land region 10 even after the middle stage of the tread wear life to provide the edge effect.

The shallow part 34a is connected to the second crown main groove 4. The deep part 34c is connected to the second shoulder main groove 6. The mid-depth part 34b is formed in the axial center of the second middle land region 12. The inclined part 34d is formed between the shallow part 34a and the mid-depth part 34b as well as between the mid-depth part 34b and the deep part 34c. Thereby, the rigidity of the second middle land region 12 is gradually and smoothly decreased from the second crown main groove 4 to the second shoulder main groove 6, and the transient characteristic during cornering is improved.

As shown in FIG. 5, the second shoulder sipe section 36 comprises a shallow part 36a having a constant depth, a deep part 36b having a constant depth more than the shallow part 36a, and an inclined part 36c having a linearly varying depth. The deep part 36b remains in the second shoulder land region 14 even after the middle stage of the tread wear life to provide the edge effect.

The shallow part 36a is connected to the second shoulder main groove 6. The deep part 36b extends to the second tread edge Te2. The inclined part 36c is formed between the shallow part 36a and the deep part 36b. Thereby, the rigidity of the second shoulder land region 14 is gradually and smoothly decreased from the second shoulder main groove 6 to the second tread edge Te2, and the transient characteristic during cornering is improved, while the rigidity of the second shoulder land region 14 is maintained to improve the steering stability.

The axial length of the deep part 36b is more than the sum of the axial length of the shallow part 36a and the axial length of the inclined part 36c. Thereby, even after the middle stage of the tread wear life, the second shoulder sipe section 36 provides the edge effect to improve the steering stability.

Each of the third sipes 28 are intersected by the second shoulder main groove 6, and split in a third middle sipe section 38 in the second middle land region 12, and a third shoulder sipe section 40 in the second shoulder land region 14.

The third middle sipe section 38 and the third shoulder sipe section 40 are smoothly continued through the second shoulder main groove 6. In other words, the third middle sipe section 38 and the third shoulder sipe section 40 are disposed on a smoothly curved or substantially straight line. Thereby, the rigidity distribution and ground pressure distribution in the land regions 12 and 14 become smooth along the sipe sections 38 and 40, and the uneven wear is further suppressed. Further, the transient characteristic during cornering is improved, and the steering stability of the pneumatic tire is improved.

As shown in FIG. 3, the first tread half portion 21 is provided with third shallow grooves 45.

Each of the third shallow grooves 45 is a bent groove comprising a first part 45a and a second part 45b.

The first part 45a extends straight in a tire axial direction and has an axially inner end 45c and an axially outer end 45d within the first shoulder land region 13.

The second part 45b is inclined with respect to the tire circumferential direction and extends straight from the first shoulder land region 13 to the first middle land region 11 to have an axially outer end 45d in the first shoulder land region 13 and an axially inner end 45e in the first middle land region 11.

The depth of the third shallow groove 45 may be less than the first shallow groove 43.

The third shallow grooves 45 maintain the rigidity of the first tread half portion 21 to improve the steering stability, while improving the wet performance in the initial stage of the tread wear life.

In the present embodiment, the third shallow grooves 45 respectively extend through intersecting points P of the center lines of the first shallow grooves 43 with the center line of the first shoulder main groove 5 in order to increase the drainage of the first tread half portion 21.

As shown in FIG. 4, the second shoulder land region 14 is provided with fourth shallow grooves 46.

Each of the fourth shallow grooves 46 is formed along one of the third shoulder sipe sections 40 so as to include the third shoulder sipe section 40. In other words, each of the third shoulder sipe sections 40 is formed in the bottom of one of the fourth shallow grooves 46.

The fourth shallow groove 46 is positioned on both sides in the tire circumferential direction of the third shoulder sipe section 40. In other words, the third shoulder sipe sections 40 is formed along the widthwise center line of the fourth shallow grooves 46. Thereby, the drainage of the second shoulder land region 14 is increased.

The crown land region 10 is provided with flat chamfers 51 at acute angled corners formed between the first sipes 25 and the first crown main groove 3 as shown in FIG. 3.

The chamfers 51 mitigate stress concentration on the crown land region 10 to suppress uneven wear, and increase the drainage of the first crown main groove 3.

As shown in FIG. 3, the first middle land region 11 is provided with flat chamfers 53 at acute angled corners formed between the first sipes 25 and the first crown main groove 3, and curved chamfers 55 at obtuse angled corners formed between the first sipes 25 and the first crown main groove 3. The curved chamfers 55 help to increase the drainage of the first crown main groove 3 while securing the rubber volume of the first middle land region 11.

The flat chamfers 53 mitigate stress concentration on the first middle land region 11 to suppress uneven wear, and increase the drainage of the first crown main groove 3.

The radial dimension of the chamfer 53 is more than the radial dimension of the chamfer 55 so that the chamfers 53 remain after the chamfers 55 disappear by the progress of the tread wear, and the uneven wear of the first middle land region 11 is prevented.

The first shoulder land region 13 is provided with flat chamfers 57 at acute angled corners formed between the first sipes 25 and the first shoulder main groove 5.

The chamfers 57 mitigate stress concentration on the first shoulder land region 13, and increase the drainage of the first shoulder main groove 5.

As shown in FIG. 4, the crown land region 10 is further provided with flat chamfers 52 at acute angled corners formed between the second sipes 26 and the second crown main groove 4. The function and effect of the chamfers 52 are the same as the chamfers 51.

The second middle land region 12 is provided with flat chamfers 54 at acute angled corners formed between the second sipes 26 and the second crown main groove 4, and curved chamfers 56 at obtuse angled corners formed between the second sipes 26 and the second crown main groove. The radial dimension of the chamfer 54 is more than the radial dimension of the chamfer 56 so that the chamfers 54 remain after the chamfers 56 disappear by the progress of the tread wear, and the uneven wear of the second middle land region 12 is prevented.

Further, the second middle land region 12 is provided with flat chamfers 58 at acute angled corners formed between the second sipes 26 and the second shoulder main groove 6. The chamfers 58 mitigate stress concentration on the second middle land region 12 to suppress uneven wear, and increase the drainage of the second shoulder main groove 6.

The second shoulder land region 14 is provided with flat chamfers 60 at acute angled corners formed between the third sipes 28 and the second shoulder main groove 6. The function and effect of the chamfers 60 are the same as the chamfers 57.

While detailed description has been made of an especially preferable embodiment of the present invention, the present invention can be embodied in various forms without being limited to the illustrated embodiment.

Comparison Test

Based on the tread pattern shown in FIG. 1, pneumatic tires of size 215/60R16 (rim size 16×7.0J) and having specifications listed in Table 1 were experimentally manufactured and tested for the steering stability.

<Steering Stability Test> using a 2500 cc FR passenger car provided on all wheels with test tires inflated to 250 kPa, the test driver evaluated steering stability based on the steering response and grip performance during running on a dry asphalt road in a test course. The results are indicated in Table 1 by an index based on Ex. 1 being 100, wherein the larger the value, the better the steering stability.

TABLE 1

| Tire | Ref. 1 | Ref. 2 | Ex. 1 | Ex. 2 | Ex. 3 | Ex. 4 |
|---|---|---|---|---|---|---|
| first sipes | | | | | | |
| width (mm) | 2.5 | 0.6 | 0.6 | 2.0 | 0.6 | 0.6 |
| inner end position *1 | 21 | 21 | 22 | 22 | 22 | 22 |
| smoothly continued? | no | no | yes | yes | yes | yes |
| second sipes | | | | | | |
| width (mm) | 2.5 | 0.6 | 0.6 | 2.0 | 0.6 | 0.6 |

TABLE 1-continued

| Tire | Ref. 1 | Ref. 2 | Ex. 1 | Ex. 2 | Ex. 3 | Ex. 4 |
|---|---|---|---|---|---|---|
| inner end position *1 | 22 | 22 | 22 | 22 | 22 | 22 |
| smoothly continued? | no | no | yes | yes | no | yes |
| inclination *2 | same | same | same | same | same | opposite |
| steering stability | 70 | 80 | 100 | 90 | 90 | 90 |

*1 21: in the first tread half portion
22: in the second tread half portion
*2 same: inclined to the same direction as the first sipes
opposite: inclined to the opposite direction to the first sipes From the test results, it was confirmed that the pneumatic tires Ex. 1-Ex. 4 according to the present invention were improved in the steering stability in comparison with comparative examples Ref. 1 and Ref. 2.

REFERENCE SIGNS LIST 2 tread portion
3 first crown main groove
4 second crown main groove
5 first shoulder main groove
6 second shoulder main groove
10 crown land region
11 first middle land region
12 second middle land region
13 first shoulder land region
14 second shoulder land region
21 first tread half portion
22 second tread half portion
25 first sipe
26 second sipe
28 third sipe
41 first shoulder lug groove
42 second shoulder lug groove

The invention claimed is:

1. A pneumatic tire comprising:
a tread portion which is provided, on each side of a tire equator, with an axially inner crown main groove and an axially outer shoulder main groove each extending continuously in a circumferential direction so as to define a crown land region between the crown main grooves, a pair of middle land regions between the crown main grooves and shoulder main grooves, and a pair of shoulder land regions axially outside the shoulder main grooves,
wherein
the tread portion, which has a first tread edge, a second tread edge, a first tread half portion between the first tread edge and the tire equator, and a second tread half portion between the second tread edge and the tire equator, is provided with first sipes and second sipes,
wherein
each of the first sipes extends along a curved line or alternatively a substantially straight line from its axially inner end located at a position in the crown land region in the second tread half portion spaced apart from the tire equator to its axially outer end located at a position in the shoulder land region in the first tread half portion spaced apart from the tire equator through the crown main groove and the shoulder main groove disposed in the first tread half portion, while having a width of less than 2 mm over the entire length thereof,
wherein
each of the second sipes extends from its axially inner end located at a position in the crown land region in the second tread half portion spaced apart from the tire equator to the second tread edge, while having a width of less than 2 mm over the entire length thereof,
wherein
the shoulder land region in the second tread half portion is provided with
second shoulder lug grooves each extending axially inwardly from the second tread edge and having an axially inner end within the shoulder land region in the second tread half portion, and
third sipes extending axially inwardly from the axially inner ends of the respective second shoulder lug grooves into the middle land region in the second tread half portion, and each having a width of less than 2 mm over the entire length thereof,
wherein
the third sipes are smoothly continued from the shoulder land region to the middle land region through the shoulder main groove in the second tread half portion, and
the third sipes have axially inner ends connected to the respective second sipes in the middle land region in the second tread half portion.

2. The pneumatic tire according to claim 1, wherein
the first sipes in the crown land region, the middle land region and the shoulder land region in the first tread half portion, and the second sipes in the crown land region and the middle land region in the second tread half portion are inclined in the same direction.

3. The pneumatic tire according to claim 1, wherein
each of the first sipes extends along a curved line.

4. The pneumatic tire according to claim 1, wherein
the first tread half portion is provided with shallow grooves, and
each of the shallow grooves is a bent groove made up of
a first part extending straight in a tire axial direction and having an axially inner end and an axially outer end within the shoulder land region in the first tread half portion, and
a second part inclined with respect to the tire circumferential direction and extending straight from said shoulder land region into the middle land region in the first tread half portion so as to have an axially outer end in said shoulder land region and an axially inner end in said middle land region.

5. The pneumatic tire according to claim 1, wherein
the crown land region is provided with no sipes other than the first and second sipes.

6. The pneumatic tire according to claim 1, wherein
the first sipes each have a substantially constant width along the entire length thereof, and
the second sipes each have a substantially constant width along the entire length thereof.

7. The pneumatic tire according to claim 1, wherein
the third sipes each have a substantially constant width along the entire length thereof.

8. The pneumatic tire according to claim 1, wherein
the first sipes each have a substantially constant width along the entire length thereof,
the second sipes each have a substantially constant width along the entire length thereof, and
the third sipes each have a substantially constant width along the entire length thereof.

9. The pneumatic tire according to claim 1, wherein
the shoulder land region in the first tread half portion is provided with first shoulder lug grooves each extending axially inwardly from the first tread edge and having an axially inner end within the shoulder land region, and axially outer ends of said first sipes are respectively connected to the axially inner ends of the first shoulder lug grooves.

10. The pneumatic tire according to claim 9, wherein said second sipes each extend along a curved line or alternatively a substantially straight line from said position in the crown land region in the second tread half portion to the second tread edge through the crown main groove and the shoulder main groove in the second tread half portion.

11. The pneumatic tire according to claim 9, wherein in the shoulder land region in the first tread half portion, the first sipes intersect with the shoulder lug grooves at an angle less than 180 degrees.

12. The pneumatic tire according to claim 1, wherein said second sipes are each smoothly continued from said position in the crown land region in the second tread half portion to a position in the shoulder land region in the second tread half portion through the crown main groove and the shoulder main groove in the second tread half portion.

13. The pneumatic tire according to claim 12, wherein the tire is provided with an indication about which sidewall portion of the tire is to be positioned away from the center of a vehicle body when the tire is attached to the vehicle body, whereby the first tread edge is positioned away from the center of the vehicle body, and the width of the shoulder main groove in the first tread half portion is less than the width of the shoulder main groove in the second tread half portion.

14. The pneumatic tire according to claim 1, wherein the second shoulder lug grooves and the second sipes are alternately arranged in the tire circumferential direction, the second sipes are bent at an axial position in the shoulder land region in the second tread half portion, the second shoulder lug grooves are substantially parallel with portions of the second sipes which are axially outside said axial position, and in the shoulder land region in the second tread half portion, the third sipes are substantially parallel with portions of the second sipes which are axially inside said axial position.

15. The pneumatic tire according to claim 14, wherein in the middle land region in the second tread half portion, the second sipes and the third sipes are alternately arranged in the tire circumferential direction, and the third sipes extend in parallel with the second sipes from the shoulder main groove toward the axially inside and then curve toward one side in the tire circumferential direction to the second sipes.

16. A pneumatic tire comprising:

a tread portion which is provided, on each side of a tire equator, with an axially inner crown main groove and an axially outer shoulder main groove each extending continuously in a circumferential direction of the tire so as to define a crown land region between the crown main grooves, a pair of middle land regions between the crown main grooves and shoulder main grooves, and a pair of shoulder land regions axially outside the shoulder main grooves, the tread portion having a first tread edge and a second tread edge, the tread portion having a first tread half portion between the first tread edge and the tire equator, and a second tread half portion between the second tread edge and the tire equator, and the tread portion provided with first sipes and second sipes whose widths are less than 2 mm over the respective entire lengths thereof, wherein each of the first sipes extends along a curved line or alternatively a substantially straight line from its axially inner end located at a position in the crown land region in the second tread half portion to its axially outer end located at a position in the shoulder land region in the first tread half portion through the crown main groove and the shoulder main groove disposed in the first tread half portion, and each of the second sipes extends from its axially inner end located at a position in the crown land region in the second tread half portion to the second tread edge, wherein the shoulder land region in the second tread half portion is provided with second shoulder lug grooves each extending axially inwardly from the second tread edge and having an axially inner end within the shoulder land region in the second tread half portion, and third sipes extending axially inwardly from the axially inner ends of the respective second shoulder lug grooves into the middle land region in the second tread half portion through the shoulder main groove in the second tread half portion, and widths of the third sipes are less than 2 mm over the respective entire lengths thereof, wherein in the middle land region in the second tread half portion, the third sipes are disposed one between every two of the circumferentially adjacent second sipes, and bent toward one circumferential direction so that the third sipes are connected to the respective second sipes.

17. The pneumatic tire according to claim 16, wherein each of the first sipes extends along a curved line.

* * * * *